US010752253B1

(12) United States Patent
Nath et al.

(10) Patent No.: US 10,752,253 B1
(45) Date of Patent: Aug. 25, 2020

(54) DRIVER AWARENESS DETECTION SYSTEM (71) Applicant: Ford Global Technologies, LLC, Dearborn, MI (US)

(72) Inventors: Nitendra Nath, Troy, MI (US); Kevin Wegienka, Northville, MI (US); Justin Teems, Saline, MI (US); Ryan Sorsby, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/553,706

(22) Filed: Aug. 28, 2019

(51) Int. Cl.
| | |
|---|---|
| *B60Q 1/00* | (2006.01) |
| *B60W 40/08* | (2012.01) |
| *B60W 50/14* | (2020.01) |
| *G06K 9/00* | (2006.01) |
| *B60W 40/10* | (2012.01) |
| *B60W 30/09* | (2012.01) |

(52) U.S. Cl.
CPC ............ *B60W 40/08* (2013.01); *B60W 30/09* (2013.01); *B60W 40/10* (2013.01); *B60W 50/14* (2013.01); *G06K 9/00845* (2013.01); *B60W 2050/143* (2013.01); *B60W 2050/146* (2013.01); *B60W 2520/06* (2013.01); *B60W 2540/30* (2013.01)

(58) Field of Classification Search
CPC ...... B60W 40/08; B60W 30/09; B60W 40/10; B60W 50/14; B60W 2050/143; B60W 2050/146; B60W 2520/06; B60W 2540/30; G06K 9/00845
See application file for complete search history.

(56) References Cited

U.S. PATENT DOCUMENTS

| | | | | |
|---|---|---|---|---|
| 7,719,431 B2* | 5/2010 | Bolourchi | ............ | B60K 28/066 340/439 |
| 8,788,134 B1* | 7/2014 | Litkouhi | ............ | B62D 15/0255 701/23 |
| 9,002,563 B2* | 4/2015 | Green | ................... | G05D 1/0055 701/23 |
| 9,290,174 B1* | 3/2016 | Zagorski | ............... | B60W 30/09 |
| 9,754,501 B2* | 9/2017 | Stenneth | ............... | B60W 40/09 |
| 10,073,456 B2* | 9/2018 | Mudalige | ............. | G05D 1/0214 |
| 10,137,893 B2* | 11/2018 | Hanna | ................ | G06K 9/00805 |
| 10,235,859 B1* | 3/2019 | Hiles | ...................... | B60W 40/09 |
| 2004/0150514 A1* | 8/2004 | Newman | ............... | G08G 1/166 340/435 |

(Continued)

FOREIGN PATENT DOCUMENTS

| | | |
|---|---|---|
| WO | 2007103180 A2 | 9/2007 |
| WO | 2018145965 A1 | 8/2018 |
| WO | 2018211033 A1 | 11/2018 |

*Primary Examiner* — Quang Pham
(74) *Attorney, Agent, or Firm* — Frank A. MacKenzie; Bejin Bieneman PLC (57) ABSTRACT

A determination that a driver of a vehicle is directed to a non on-road zone based on at least one of a head pose or an eye gaze of a driver. Based on the non on-road zone, a probability is determined that the driver does not transition from the non on-road zone to an on-road zone based on the non on-road zone. The probability is adjusted when the driver is directed to the non on-road zone for a time period that exceeds a predetermined time threshold. A warning is generated within the vehicle based on the adjusted probability.

20 Claims, 7 Drawing Sheets

(56) References Cited

U.S. PATENT DOCUMENTS

| | | | | |
|---|---|---|---|---|
| 2007/0011609 | A1* | 1/2007 | Adjouadi | G06F 3/013 715/700 |
| 2010/0007479 | A1* | 1/2010 | Smith | B60W 50/14 340/436 |
| 2010/0265074 | A1* | 10/2010 | Namba | G06K 9/00845 340/576 |
| 2014/0210978 | A1* | 7/2014 | Gunaratne | G06K 9/00845 348/77 |
| 2015/0109131 | A1* | 4/2015 | Lindberg | G08B 21/06 340/576 |
| 2016/0167671 | A1* | 6/2016 | Offenhaeuser | B60W 40/08 701/41 |
| 2016/0176339 | A1* | 6/2016 | Aimura | B60Q 9/008 701/301 |
| 2017/0129497 | A1* | 5/2017 | Zilberman | B60K 28/00 |
| 2017/0168484 | A1* | 6/2017 | Knorr | G05D 1/0061 |
| 2017/0190334 | A1* | 7/2017 | Zelman | G08G 1/096725 |
| 2018/0257682 | A1* | 9/2018 | Brooks | G05D 1/0061 |
| 2018/0297520 | A1* | 10/2018 | Morimura | G02B 27/0101 |
| 2018/0339670 | A1* | 11/2018 | Nishimura | G08G 1/165 |
| 2019/0246036 | A1* | 8/2019 | Wu | H04N 5/247 |
| 2019/0250795 | A1* | 8/2019 | Weldemariam | H04L 67/18 |
| 2019/0279009 | A1* | 9/2019 | Srirangam Narashiman | G06K 9/2018 |
| 2019/0303723 | A1* | 10/2019 | Linden | G06K 9/00617 |
| 2019/0303724 | A1* | 10/2019 | Linden | G06F 3/013 |
| 2019/0318157 | A1* | 10/2019 | Nomoto | G06K 9/00228 |
| 2019/0346844 | A1* | 11/2019 | Chen | B60W 60/00 |
| 2019/0370580 | A1* | 12/2019 | Aoi | G06K 9/6273 |
| 2020/0005131 | A1* | 1/2020 | Nakahara | G06N 3/063 |

\* cited by examiner

DRIVER AWARENESS DETECTION SYSTEM

BACKGROUND

Vehicles use sensors to collect data while operating, the sensors including radar, LIDAR, vision systems, infrared systems, and ultrasonic transducers. Vehicles can actuate the sensors to collect data while traveling along roadways. Based on the data, it is possible to determine parameters associated with the vehicle. For example, sensor data can be indicative of objects relative to the vehicle.

BRIEF DESCRIPTION OF THE DRAWINGS

FIG. 7 is a flow diagram illustrating an example process for determining an attention zone a driver is focused on.

DETAILED DESCRIPTION

Vehicle sensors can provide information about a vehicle's surrounding environment, and computers can use sensor data detected by the vehicle sensors to classify objects and/or estimate one or more physical parameters pertaining to the surround environment. Some vehicle computers may use machine learning techniques to assist in classifying objects and/or estimating physical parameters. Some vehicle sensors monitor driver behavior. These vehicle sensors can include cameras that capture images of the driver.

The present disclosure describes a driver assessment system that determines whether to generate a warning, i.e., an alert, to re-engage the driver. The driver assessment system determines whether to generate the warning based on or more received images captured by at least one camera within the vehicle. Based on the received images, the driver assessment system can determine whether the driver's attention is on-road or off-road. In some implementations, the driver assessment system can determine a particular zone that the driver's attention is focused based on the received images. If the driver's attention is off-road for an extended period of time, the driver assessment system can generate the warning to re-engage the driver.

A system comprises a computer including a processor and a memory, and the memory including instructions such that the processor is programmed to determine that a driver of a vehicle is directed to a non on-road zone based on at least one of a head pose or an eye gaze of a driver, determine a probability that the driver does not transition from the non on-road zone to an on-road zone based on the non on-road zone, adjust the probability when the driver is directed to the non on-road zone for a time period that exceeds a predetermined time threshold, and generate a warning within the vehicle based on the adjusted probability.

In other features, the processor is further programmed to actuate at least one vehicle system of the vehicle based on the warning.

In other features, the actuation of the at least one vehicle system causes the vehicle to decelerate.

In other features, the processor is further programed to generate the warning at an infotainment device of the vehicle.

In other features, the infotainment device generates at least one of a visual warning or an audio warning.

In other features, the processor is further programmed to determine a type of warning to generate based on at least one of a length of the time period exceeding the predetermined time threshold or a vehicle parameter, the vehicle parameter comprises at least one a distance between the vehicle and another vehicle, a yaw rate of the vehicle, or a velocity of the vehicle, and the type of warning comprises at least one of a visual warning or an audible warning.

In other features, the processor is further programmed to receive an image depicting the driver from a camera disposed within the vehicle; and determine that at the driver of the vehicle is directed to the non on-road zone based on the image.

In other features, the processor is further programmed to determine that at the driver of the vehicle is directed to a non on-road zone via a deep neural network that classifies the image.

In other features, the deep neural network comprises a convolutional neural network.

In other features, the non on-road zone includes an on-road right zone, a rearview mirror zone, a driver mirror zone, a passenger mirror zone, a cluster zone, a console zone, a driver lap zone, and a passenger foot well zone.

In other features, the probability is defined by P (Inattentive)=1−P(OnRoad), where P (Inattentive) represents the probability that the driver does not transition from the non on-road zone to an on-road zone based on the non on-road zone and P(OnRoad) represents a probability the driver from the non on-road zone to an on-road zone based on the non on-road zone.

In other features, the P(OnRoad) is defined by P(OnRoad)= P1(OnRoad)+P2(OnRoad)+P3(OnRoad), where P1(OnRoad) represents a probability that the driver is directed to the on-road zone given a first non on-road zone, P2(OnRoad) represents a probability that the driver is directed to the on-road zone given a second non on-road zone, and P3(OnRoad) represents a probability that the driver is directed to the on-road zone given a third non on-road zone.

A method comprises determining that a driver of a vehicle is directed to a non on-road zone based on at least one of a head pose or an eye gaze of a driver depicted within an image; determining a probability that the driver does not transition from the non on-road zone to an on-road zone based on the non on-road zone; adjusting the probability when the driver is directed to the non on-road zone for a time period that exceeds a predetermined time threshold; and generating a warning within the vehicle based on the adjusted probability.

In other features, the method includes actuating at least one vehicle system of the vehicle based on the warning.

In other features, the method includes generating the warning at an infotainment device of the vehicle.

In other features, the method includes determining a type of warning to generate based on at least one of a length of the time period exceeding the predetermined time threshold or a vehicle parameter, wherein the vehicle parameter comprises at least one a distance between the vehicle and another vehicle, a yaw rate of the vehicle, or a velocity of the vehicle, and wherein the type of warning comprises at least one of a visual warning or an audible warning.

In other features, the method includes receiving the image depicting the driver from a camera disposed within the vehicle; and determining that at the driver of the vehicle is directed to the non on-road zone based on the image.

In other features, the method includes determining that at the driver of the vehicle is directed to a non on-road zone via a deep neural network that classifies the image.

In other features, the deep neural network comprises a convolutional neural network.

In other features, the non on-road zone includes an on-road right zone, a rearview mirror zone, a driver mirror zone, a passenger mirror zone, a cluster zone, a console zone, a driver lap zone, and a passenger foot well zone.

Figure 1:
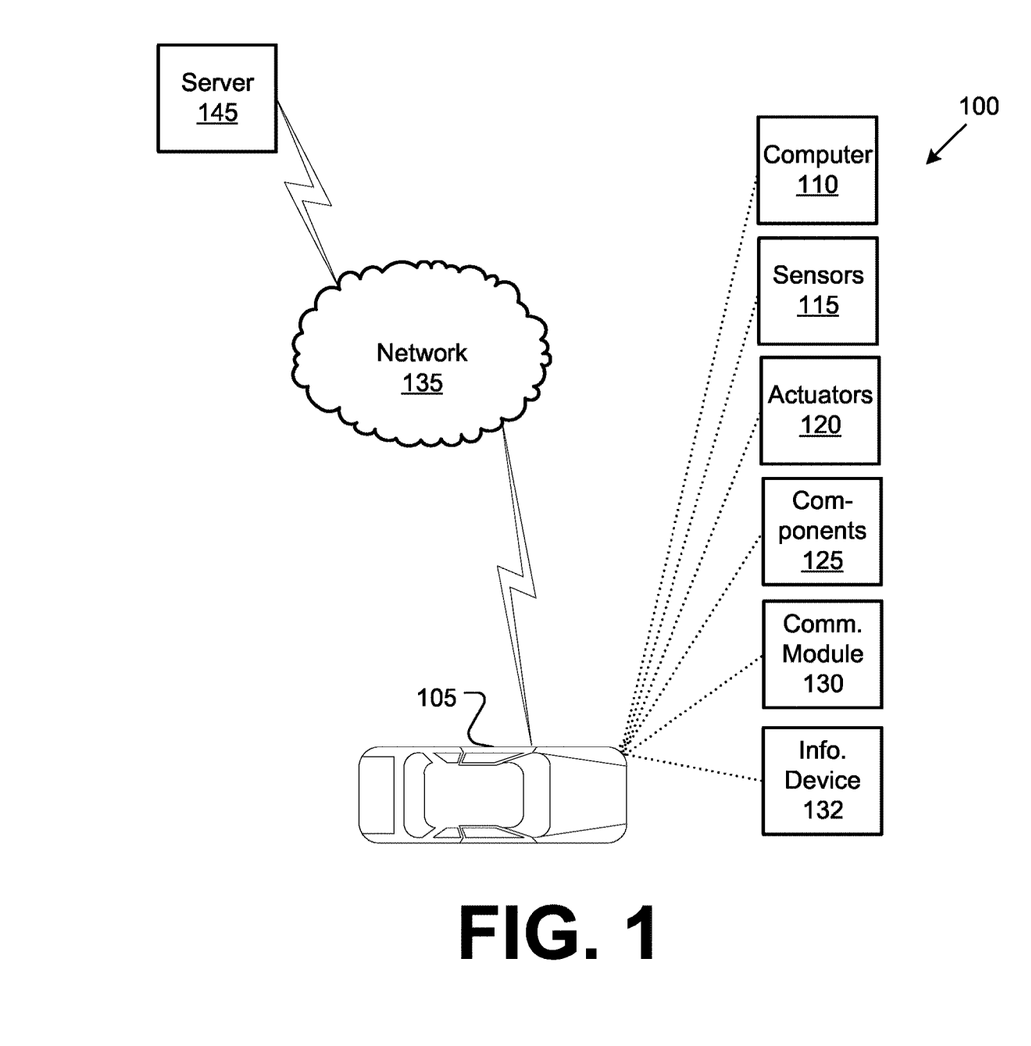
FIG. 1 is a diagram of an example system for determining a driver's attentiveness.

FIG. 1 is a block diagram of an example vehicle control system 100. The system 100 includes a vehicle 105, which is a land vehicle such as a car, truck, etc. The vehicle 105 includes a computer 110, vehicle sensors 115, actuators 120 to actuate various vehicle components 125, a vehicle communications module 130, and an infotainment device 132. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects, etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The infotainment device 132 can include one or more speakers and/or displays. The infotainment device 132 includes one or more processors and memory that stores computer-executable instructions. The infotainment device 132 can also include a human machine interface (HMI) to allow the driver and/or other occupants to interact with the infotainment device 132.

The network 135 includes one or more mechanisms by which a computer 110 may communicate with a server 145. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

The server 145 can be a computing device, i.e., including one or more processors and one or more memories, programmed to provide operations such as disclosed herein. Further, the server 145 can be accessed via the network 135, e.g., the Internet or some other wide area network. The computer 110 can receive and analyze data from sensors 115 substantially continuously, periodically, and/or when instructed by a server 145, etc.

Figure 2:
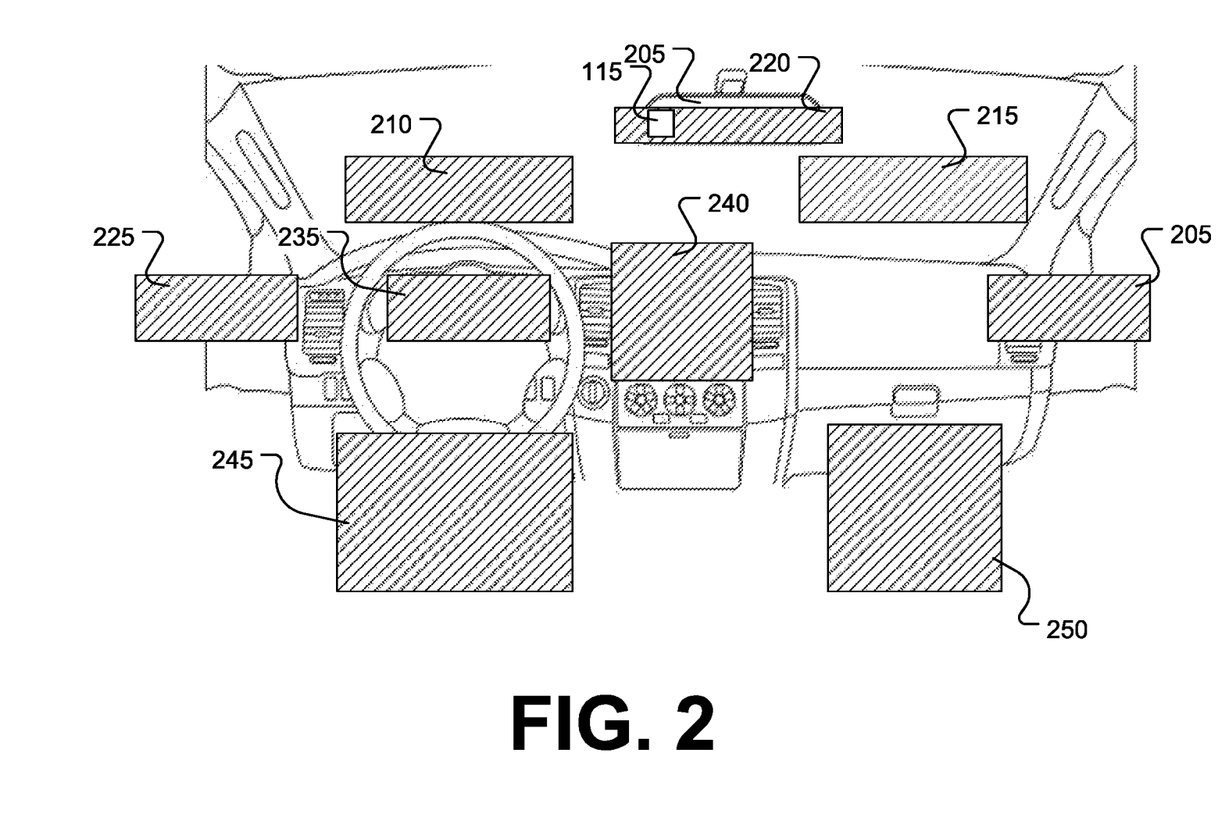
FIG. 2 is an example diagram illustrating various attention zones within a vehicle.

As shown in FIG. 2, the vehicle 105 includes a rear-view mirror 205, and the rear-review mirror 205 includes a camera 115. The camera 115 is oriented such that the camera 115 captures images of a driver of the vehicle 105 and provides the images to the computer 110. The computer 110 is configured to detect and track the driver's head pose and eye gaze based on the captured images. Based on the tracked head pose and/or eye gaze data, the computer 110 determines whether to generate a warning to re-engage the driver. The warning can indicate to the driver that the driver needs to transition the driver's eye gaze direction onto the roadway. Once the driver's eye gaze direction is determined to be on the roadway, the computer 110 can terminate the warning. In an example implementation, the warning can be generated at the infotainment device 132. For example, the infotainment device 132 can generate a visual indicator, an audible indicator, or a combination of both, via the speakers and/or the display of the infotainment device 132.

The computer 110 may determine, based on the captured images, one or more attention zones that the driver's eyes, i.e., eye gaze direction, may be focused at or the driver's head pose is directed. As shown in FIG. 2, the attention zones can be defined as an on-road zone 210, an on-road right zone 215, a rearview mirror zone 220, a driver mirror zone 225, a passenger mirror zone 230, a cluster zone 235, a console zone 240, a driver lap zone 245, and a passenger foot well zone 250.

In an example implementation, the computer 110 may use one or more classifiers that classify the head pose and/or the eye gaze direction of the driver and associated one of the attention zones with the classified data. In some examples, the computer 110 can include a lookup table that relates the classified data with one of the attention zones. Thus, once trained, the classifier can accept as input an image and then provide as output representing which attention zone the driver is focused. In some implementations, the computer 110 can include a neural network, such as a deep neural network (DNN), that can be trained to accept camera 115 data, e.g., from the vehicle 101 CAN bus or other network, as input and generate an output indicative of which attention zone the driver is focused on.

Figure 3:
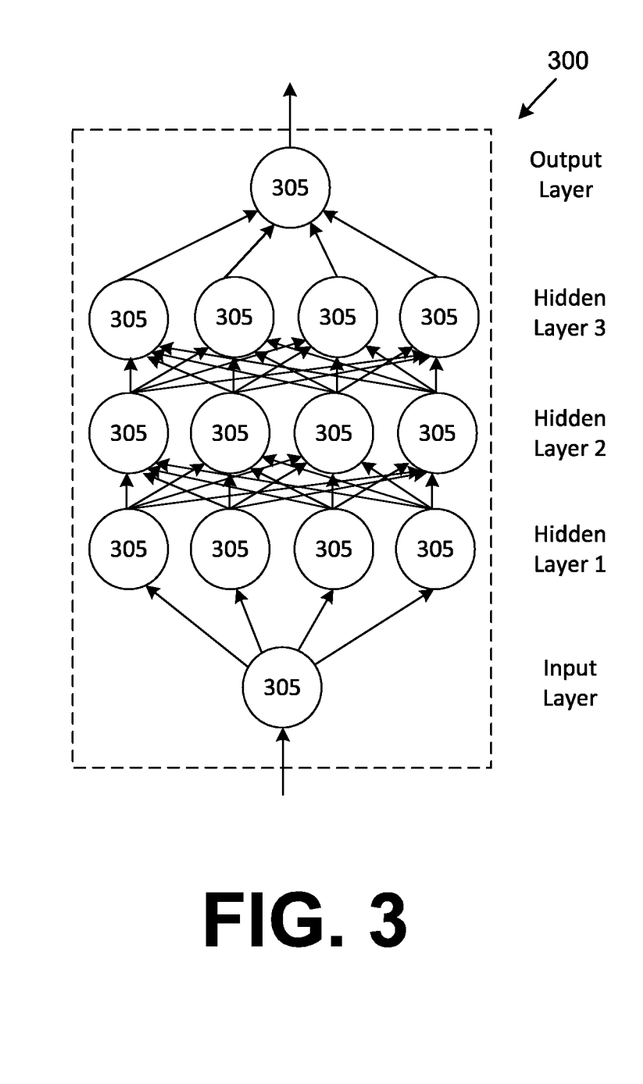
FIG. 3 is an example diagram of a deep neural network that classifies head poses and/or eye gaze direction of a driver.

FIG. 3 is a diagram of an example deep neural network (DNN) 300. The DNN 300 can be a software program that can be loaded in memory and executed by a processor included in computer 110, for example. In an example implementation, the DNN 300 can include, but is not limited to, a convolutional neural network (CNN), R-CNN (regions with CNN features), Fast R-CNN, and Faster R-CNN. The DNN includes multiple nodes, and the nodes are arranged so that the DNN 300 includes an input layer, one or more hidden layers, and an output layer. Each layer of the DNN 200 can include a plurality of nodes 305. While FIG. 3 illustrate three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 205 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can accept sensor 115 data, e.g., from the vehicle 101 CAN bus or other network, as input and generate a one or more outputs, or predictions, based on the input. As discussed below, the predictions may be a predicted zone 210 through 250 that the driver's head pose and/or eye gaze is directed. The DNN 300 can be trained with ground truth data, i.e., data about a real-world condition or state. For example, the DNN 300 can be trained with ground truth data or updated with additional data by a processor of the server 145. The DNN 300 can be transmitted to the vehicle 105 via the network 135. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data specifying objects within an image or data specifying a physical parameter. For example, the ground truth data may be data representing objects and object labels. In another example, the ground truth data may be data representing object and a relative angle of the object with respect to another object.

During operation, the vehicle 105 computer 110 obtains data from the sensors 115 and provides the data as input to the DNN 300. The DNN 300 generates a prediction based on the received input. The prediction is indicative of the eye gaze direction and/or head pose of the driver. For example, the prediction indicates which zone 210 through 250 the driver's eye gaze and/or head pose is directed. However, it is understood that other suitable techniques for determining a driver's head pose and/or eye gaze direction may be used as well.

Figure 4A:
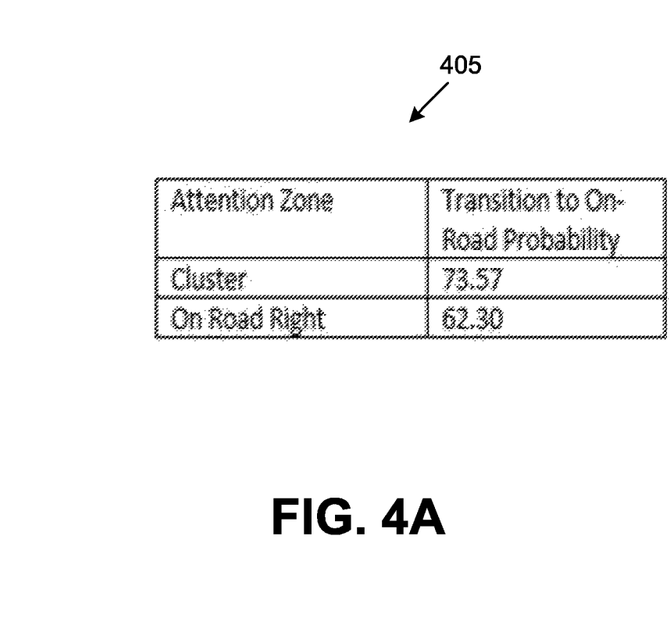
FIGS. 4A through 4C illustrate example categories including various attention zones and corresponding probability transitions.
Figure 4B:
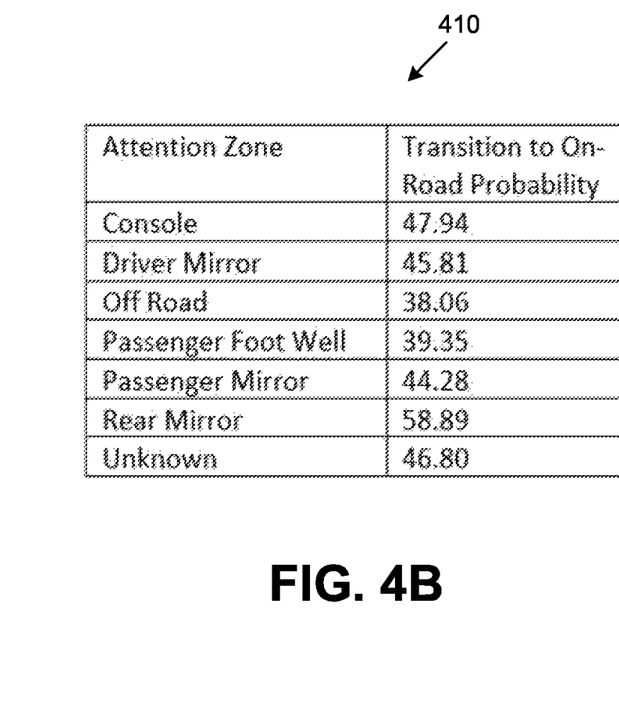
Figure 4C:
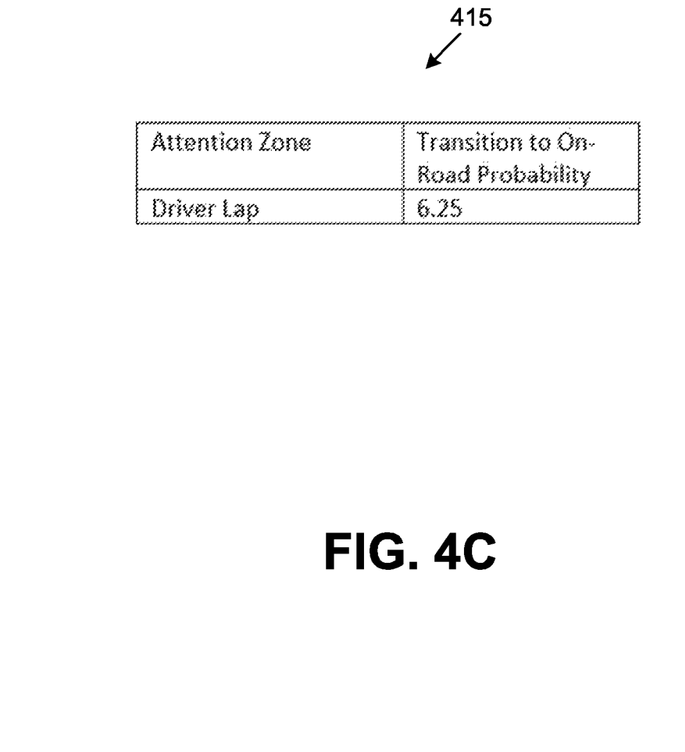

The various zones 215 through 250 (other than the on-road zone 210) can be binned, i.e., assigned, into similar categories based on a determined transition to on-road probability. For example, each category be associated with particular zones 215 through 250. FIGS. 4A through 4C illustrate example categories 405, 410, 415 for which the various zones 215 through 250 are binned together based on a determined probability that the driver's head pose and/or eye gaze will transition from the present category to the on-road zone 210. The probabilities to transition from the current zone 215 through 250 to the on-road zone can be determined based on driving data collected via one or more suitable driver monitoring camera systems and empirical analysis applied to the driving data. The probabilities are indicative of the likelihood that a driver having a head pose and/or eye gaze directed to a non on-road zone 215 through 250 transitions to the on-road zone 210 without warning or prompting. The categories 405 through 415 can be saved in the memory of the computer 110. Once a prediction representing which zone 215 through 250 the head pose and/or eye gaze is directed is generated, the computer 110 determines the category 405 through 415 associated with the prediction.

Figure 5:
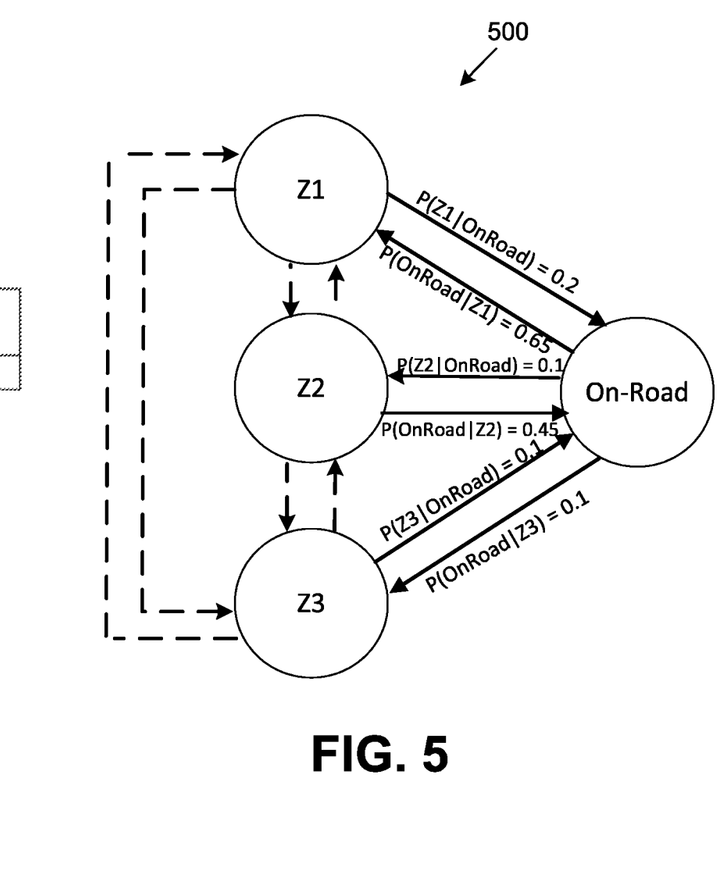
FIG. 5 is an example mapping illustrating various transitions between categories.

FIG. 5 illustrates an example mapping 500 of transitions between the various categories 405 through 415 and the on-road zone 210. As represented in FIG. 5 and herein, "Z1" corresponds to category 405, "Z2" corresponds to category 410, "Z3" corresponds to category 415, and "On-Road" corresponds to the on-road zone 210. Within the current context, the transitions between Z1, Z2, Z3, and On-Road are represented in solid lines since these are the probabilities of interest. The transitions between the Z1, Z2, and Z3 are represented in dotted lines. Each transition between Z1, Z2, Z3, and the on-road zone 210 includes an example probability based on the data shown in FIGS. 4A through 4C. The probabilities can be obtained through a generalized average over the values of the particular zones 210 through 250. It is understood that these calculations and data are only being used for illustration purposes. Additionally, the transitions are considered mutually exclusive events since the prediction corresponds to a single zone.

In an example implementation, the Bayes Theorem for Conditional Probability can be used to obtain an individual probability of the driver's head pose and/or eye gaze is directed to the on-road zone 210. Equation 1 defines an individual probability, within the context of category Z1, of whether the driver's head pose and/or eye gaze direction is directed to the on-road zone 210 as:

$$P1(OnRoad) = \frac{P(OnRoad \mid Z1)P(Z1)}{P(Z1 \mid OnRoad)}$$

where P(OnRoad|Z1) represents the probability of whether the head pose and/or eye gaze is directed to the on-road zone 210 given category Z1, P(Z1) represents the probability of category Z1, and P(Z1|OnRoad) represents the probability of category Z1 given the head pose and/or eye gaze is directed to the on-road zone 210.

Equation 2 defines an individual probability, within the context of category Z2, of whether the driver's head pose and/or eye gaze direction is directed to the on-road zone 210 as:

$$P2(OnRoad) = \frac{P(OnRoad \mid Z2)P(Z2)}{P(Z2 \mid OnRoad)}$$

where P(OnRoad|Z2) represents the probability of whether the head pose and/or eye gaze is directed to the on-road zone 210 given category Z2, P(Z2) represents the probability of category Z2, and P(Z2|OnRoad) represents the probability of category Z2 given the head pose and/or eye gaze is directed to the on-road zone 210.

Equation 3 defines an individual probability, within the context of category Z3, of whether the driver's head pose and/or eye gaze direction is directed to the on-road zone 210 as:

$$P3(OnRoad) = \frac{P(OnRoad \mid Z3)P(Z3)}{P(Z3 \mid OnRoad)}$$

where P(OnRoad|Z3) represents the probability of whether the head pose and/or eye gaze is directed to the on-road zone 210 given category Z3, P(Z3) represents the probability of category Z3, and P(Z3|OnRoad) represents the probability of category Z3 given the head pose and/or eye gaze is directed to the on-road zone 210.

The total on-road probability of whether the driver's head pose and/or eye gaze will transition to the on-road zone 210 can be given by equation 4:

$$P(OnRoad)=P1(OnRoad)+P2(OnRoad)+P3(OnRoad).$$

Based on the total probability, the probability of the driver's head pose and/or eye gaze not being directed to the on-road zone 210, or the inattentive probability, can be given by equation 5:

$$P(Inattentive)=1-P(OnRoad).$$

As described in greater detail below, the computer 110 determines whether to generate a warning, i.e., alert, to re-engage the driver based on the prediction and the probabilities.

Figure 6:
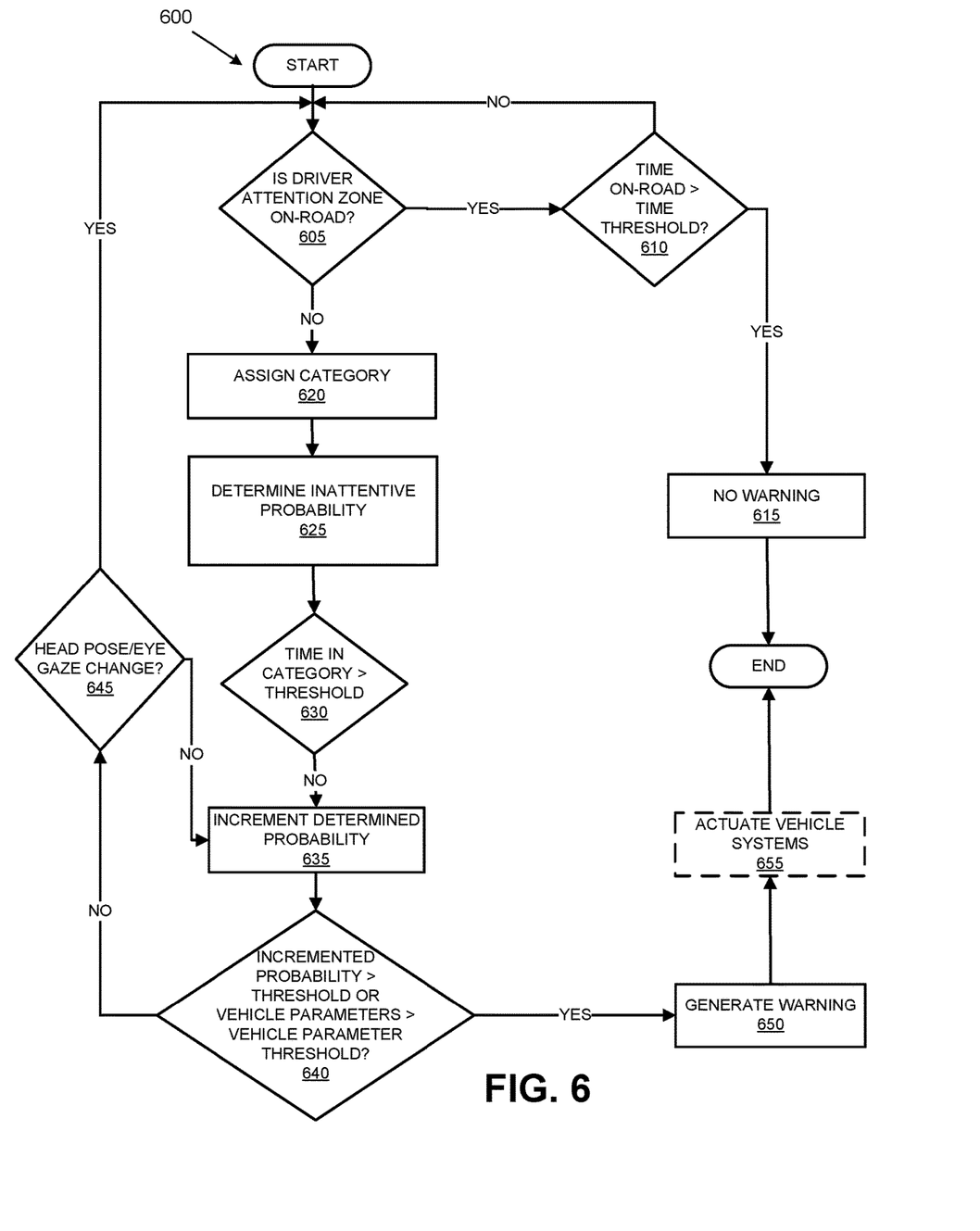
FIG. 6 is a flow diagram illustrating an example process for determining whether to generate a warning based a head pose and/or eye gaze direction of the driver.

FIG. 6 is a flowchart of an exemplary process 600 for determining whether to generate the warning to re-engage the driver. Blocks of the process 600 can be executed by the computer 110. The process 600 begins at block 605 in which a determination is made whether the driver's head pose and/or eye gaze is directed to the on-road zone 210. For example, the computer 110 receives one or more images of a driver within the vehicle 105 from the camera 115 (see FIG. 7).

If the head pose and/or eye gaze is directed to the on-road zone 210, a determination is made whether the time the head pose and/or eye gaze is directed to the on-road zone is greater than a first predetermined time threshold at block 610. If the time is greater than the first predetermined time threshold, the computer 110 does not generate a warning at block 615.

If the head pose and/or eye gaze is not directed to the on-road zone 210 or the time is not greater than the first predetermined time threshold, the images are assigned to a category, i.e., category 405, category 410, category 415, based on the prediction at block 620. At block 625, the inattentive probability is determined based on the assigned category 405 through 415.

At block 630, the inattentive probability is incremented by a predetermined value for every time value that is greater than the third predetermined time threshold. A predetermined value can correspond to each category 405 through 415. For example, a first predetermined value, e.g., 0.05, corresponds to the category 405, a second predetermined value, e.g., 0.10, corresponds to the category 410, and so on. The predetermined values may be generated based on empirical analysis relating to the assigned category 405 through 415 with respect to the probability the driver transitions the driver's head pose and/or eye gaze to the on-road zone 210. The predetermined values may be adjustable based on received data and/or operator provided parameters.

At block 640, a determination is made whether the inattentive probability threshold is greater than a predetermined probability threshold or the vehicle data parameter is greater than a predetermined vehicle parameter threshold. The vehicle data parameter may comprise vehicle data collected by the vehicle 105 sensors 115. The vehicle data can include, but is not limited to, a distance between the vehicle 105 and another vehicle, a velocity of the vehicle 105, a vehicle yaw rate, or the like.

If the inattentive probability threshold is less than or equal to the predetermined probability threshold and the vehicle data parameter is less than or equal to the predetermined vehicle parameter threshold, a determination is made whether the driver's head pose and/or eye gaze changed at block 645. For example, the computer 110 may determine that the driver's head pose and/or eye gaze is directed to a different zone based on a prediction received from the DNN 300. If the driver's head pose and/or eye gaze has changed, the process 600 returns to block 605. Otherwise, the process 600 returns to block 635.

If the inattentive probability threshold is greater than the predetermined probability threshold or the vehicle data parameter is greater than the predetermined vehicle parameter threshold, a warning to re-engage the driver is generated at block 650. In an example implementation, the computer 110 can generate a warning having one or more warning characteristics based on how much the inattentive probability threshold exceeds the inattentive probability and/or the vehicle parameters. For example, the computer 110 may vary a frequency of the warning, the type of warning, e.g., visual, audio, combination of both, if the incremented inattentive probability exceeds the inattentive probability threshold by a predefined amount or the vehicle is within a certain distance of another vehicle. In some implementations, the computer 110 can use a lookup table that relates inattentive probability and/or the vehicle parameters to warning characteristics. In some implementations, the computer 110 may actuate one or more vehicle 105 actuators 120, one or more vehicle 105 components 125, and/or the vehicle 105 communication module 130. For instance, the computer 110 may cause the vehicle 105 to decelerate, initiate a V2V communication, or the like. The predetermined vehicle parameter threshold and predetermined time thresholds can be determined based on collected driving data and empirical analysis applied to the driving data.

Figure 7:
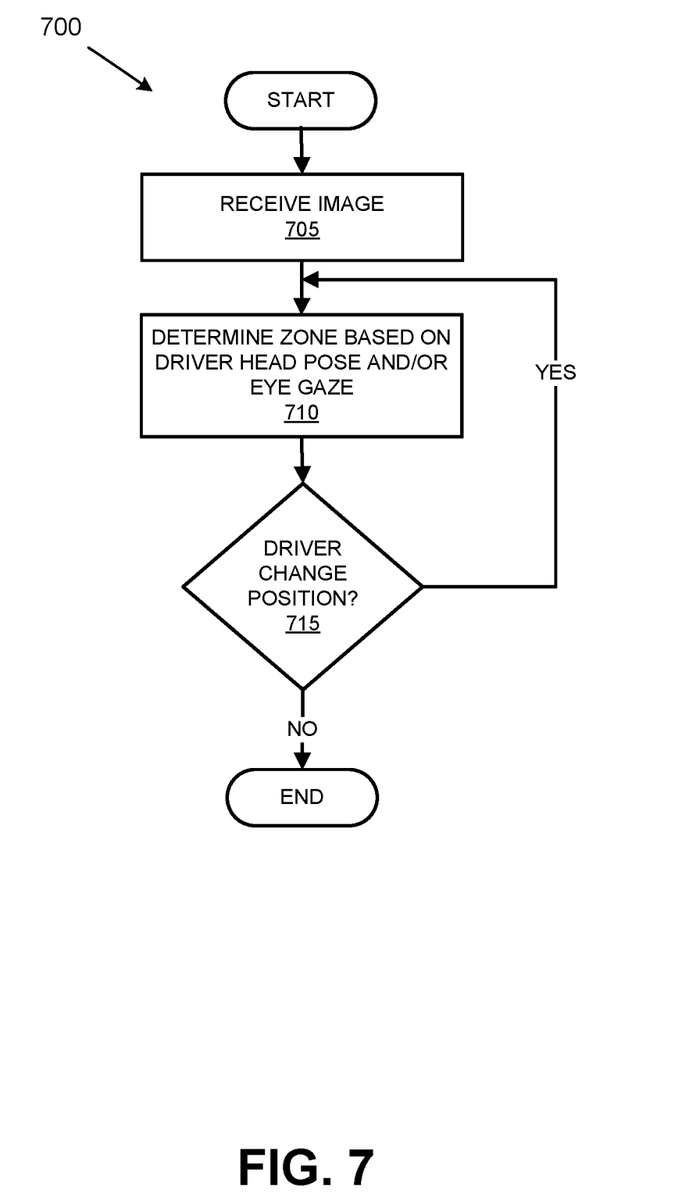

FIG. 7 is a flowchart of an exemplary process 700 for determining whether to generate the warning to re-engage the driver. Blocks of the process 700 can be executed by the computer 110. The process 700 begins at block 705 in which one or more images are received. At block 710, the computer 110 determines the zone 210 through 250 that the driver's head pose and/or eye gaze is directed. In an implementation, the images captured by the camera 115 can be provided to the DNN 300, and the DNN 300 is configured to generate a prediction based on the received images. The prediction is indicative of which zone 210 through 250 the driver's head pose and/or eye gaze is directed. The zone 210 through 250 determination can be used by the computer 110 as described above and illustrated in FIG. 6.

At block 715, a determination is made whether the driver changed position. For example, based on the received images, the computer 110 can determine that the driver's head pose and/or eye gaze direction has changed. If the driver has changed position, the process 700 returns to block 710. Otherwise, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for a vehicle comprising a computer including a processor and a memory, the memory including instructions when executed by the processor such that the processor is programmed to:

determine that a driver of the vehicle is directed to a non on-road zone based on at least one of a head pose or an eye gaze of the driver depicted within an image, wherein the non on-road zone is mapped to at least one category of a plurality of categories, each category of the plurality of categories representing a different probability that the driver's head pose and/or eye gaze does not transition from the non on-road zone to an on-road zone based on the non on-road zone;

determine a probability based on the mapped category;

adjust the probability when the driver is directed to the non on-road zone for a time period that exceeds a predetermined time threshold by incrementing the probability by a predetermined amount for every time unit that is greater than the predetermined time threshold; and generate a warning within the vehicle based on the adjusted probability when the adjusted probability is greater than a probability threshold.

2. The system of claim 1, wherein the processor is further programmed to:

actuate at least one vehicle system of the vehicle based on the warning.

3. The system of claim 2, wherein the actuation of the at least one vehicle system causes the vehicle to decelerate.

4. The system of claim 1, wherein the processor is further programmed to:

generate the warning at an infotainment device of the vehicle.

5. The system of claim 1, wherein the processor is further programmed to:

determine a type of warning to generate based on at least one of a length of the time period exceeding the predetermined time threshold or a vehicle parameter, wherein the vehicle parameter comprises at least one a distance between the vehicle and another vehicle, a yaw rate of the vehicle, or a velocity of the vehicle, wherein the type of warning comprises at least one of a visual warning or an audible warning.

6. The system of claim 1, wherein the processor is further programmed to: receive the image depicting the driver from a camera disposed within the vehicle; and determine that the driver of the vehicle is directed to the non on-road zone based on the image.

7. The system of claim 6, wherein the processor is further programmed to: determine that the driver of the vehicle is directed to the non on-road zone via a deep neural network that classifies the image.

8. The system of claim 7, wherein the deep neural network comprises a convolutional neural network.

9. The system of claim 1, wherein a first category of the plurality of categories comprises an on-road right zone and a cluster zone; a second category of the plurality of categories comprises a console zone, a driver mirror zone, an off-road zone, a passenger foot well zone, a passenger mirror zone, and a rear mirror zone; and a third category of the plurality of categories comprises a driver lap zone, wherein each zone corresponds to a respective probability that contributes to a probability assigned to a respective category.

10. The system of claim 1, wherein the probability is defined by P(Inattentive)=1−P(OnRoad), where P(Inattentive) represents the probability that the driver's head pose and/or eye gaze does not transition from the non on-road zone to the on-road zone based on the non on-road zone and P(OnRoad) represents a probability the driver's head pose and/or eye gaze transitioning from the non on-road zone to the on-road zone based on the non on-road zone.

11. The system of claim 10, wherein the P(OnRoad) is defined by P(OnRoad)=P1(OnRoad)+P2(OnRoad)+P3(OnRoad), where P1(OnRoad) represents a probability that the driver's head pose and/or eye gaze is directed to the on-road zone given a first non on-road category, P2(OnRoad) represents a probability that the driver's head pose and/or eye gaze is directed to the on-road zone given a second non on-road category, and P3(OnRoad) represents a probability that the driver's head pose and/or eye gaze is directed to the on-road zone given a third non on-road category.

12. The system of claim 1, wherein the processor is further programmed to: determine whether the at least one of the head pose or the eye gaze of the driver has changed when the adjusted probability is less than or equal to the probability threshold; and then determine that the driver of the vehicle is directed to another non on-road zone based on at least one of the head pose or the eye gaze of the driver.

13. A computer method performed by a system of a vehicle to generate a warning to re-engage a driver of the vehicle, the system comprising a computer including a processor and a memory, the memory including instructions when executed by the processor such that the processor is programed to perform:
   determining that the driver of the vehicle is directed to a non on-road zone based on at least one of a head pose or an eye gaze of driver depicted within an image, wherein the non on-road zone is mapped to at least one category of a plurality of categories, each category of the plurality of categories representing a different probability that the driver's head pose and/or eye gaze does not transition from the non on-road zone to an on-road zone based on the non on-road zone;
   determining a probability based on the mapped category;
   adjusting the probability when the driver is directed to the non on-road zone for a time period that exceeds a predetermined time threshold by incrementing the probability by a predetermined amount for every time unit that is greater than the predetermined time threshold; and
   generating a warning within the vehicle based on the adjusted probability when the adjusted probability is greater than a probability threshold.

14. The method of claim 13, further comprising:
   actuating at least one vehicle system of the vehicle based on the warning.

15. The method of claim 13, further comprising:
   determining a type of warning to generate based on at least one of a length of the time period exceeding the predetermined time threshold or a vehicle parameter, wherein the vehicle parameter comprises at least one a distance between the vehicle and another vehicle, a yaw rate of the vehicle, or a velocity of the vehicle, wherein the type of warning comprises at least one of a visual warning or an audible warning.

16. The method of claim 13, further comprising: receiving the image depicting the driver from a camera disposed within the vehicle; and determining that the driver of the vehicle is directed to the non on-road zone based on the image.

17. The method of claim 16, further comprising: determining that the driver of the vehicle is directed to the non on-road zone via a deep neural network that classifies the image.

18. The method of claim 17, wherein the deep neural network comprises a convolutional neural network.

19. The method of claim 13, wherein a first category of the plurality of categories comprises an on-road right zone and a cluster zone; a second category of the plurality of categories comprises a console zone, a driver mirror zone, an off-road zone, a passenger foot well zone, a passenger mirror zone, and a rear mirror zone; and a third category of the plurality of categories comprises a driver lap zone, wherein each zone corresponds to a respective probability that contributes to a probability assigned to a respective category.

20. The method of claim 13, further comprising: determining whether the at least one of the head pose or the eye gaze of the driver has changed when the adjusted probability is less than or equal to the probability threshold; and then determining that the driver of the vehicle is directed to another non on-road zone based on at least one of the head pose or the eye gaze of the driver.

* * * * *